United States Patent
Chang et al.

(10) Patent No.: US 8,456,799 B2
(45) Date of Patent: Jun. 4, 2013

(54) MULTILAYER CERAMIC CAPACITOR AND METHOD OF MANUFACTURING THE SAME

(75) Inventors: Dong Ik Chang, Gyunggi-do (KR); Kang Heon Hur, Gyunggi-do (KR); Doo Young Kim, Gyunggi-do (KR); Ji Hun Jeong, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 160 days.

(21) Appl. No.: 13/033,897

(22) Filed: Feb. 24, 2011

(65) Prior Publication Data

US 2012/0127626 A1    May 24, 2012

(30) Foreign Application Priority Data

Nov. 22, 2010    (KR) .................. 10-2010-0116429

(51) Int. Cl.
  *H01G 4/30*    (2006.01)
  *H01G 4/005*    (2006.01)
  *H01G 4/06*    (2006.01)
(52) U.S. Cl.
  USPC ............... 361/321.2; 361/303; 361/301.4; 361/321.1
(58) Field of Classification Search
  USPC .............. 361/321.1, 321.2, 303, 301.4
  See application file for complete search history.

(56) References Cited

U.S. PATENT DOCUMENTS

2006/0256504 A1* 11/2006 Kojima .................. 361/311
2009/0067117 A1*  3/2009 Kasuya et al. .......... 361/321.2

FOREIGN PATENT DOCUMENTS

| JP | 09-260201 | | 10/1997 |
| JP | 09260201 A | * | 10/1997 |
| JP | 2001-052950 A | | 2/2001 |
| JP | 2005-327999 | | 11/2005 |
| JP | 2007-335726 A | | 12/2007 |
| JP | 2007335726 A | * | 12/2007 |
| KR | 10-2008-0005444 A | | 1/2008 |

OTHER PUBLICATIONS

Korean Office Action, with English translation, issued in Korean Patent Application No. 10-2010-0116429, dated Jan. 3, 2012.

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

Disclosed are a multilayer ceramic capacitor and a method of manufacturing the same. The multilayer ceramic capacitor includes a ceramic body having a plurality of dielectric layers stacked on top of each other, at least one internal electrode formed on a corresponding one of the plurality of dielectric layers and having uneven portions formed at an edge thereof, the internal electrode having a connectivity of between 0.7 and 0.9, which is defined by an equation below, and an external electrode formed on an outer surface of the ceramic body and connected with the internal electrode, Z=X-Y/X    (Equation)

where X denotes a length of a cross-section of the internal electrode in one direction, Y denotes a total length of gaps formed by holes in the cross-section, and Z denotes the connectivity of the internal electrode. The multilayer ceramic capacitor achieves a low crack generation rate and a high level of reliability.

14 Claims, 3 Drawing Sheets

A-A'

F-F'

B-B'

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2010-0116429 filed on Nov. 22, 2010, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a multilayer ceramic capacitor capable of achieving a low crack generation rate and a high level of reliability, and a method of manufacturing the same.

2. Description of the Related Art

In general, an electronic component employing a ceramic material, such as a capacitor, an inductor, a piezoelectric element, a varistor, a thermistor or the like, is provided with a ceramic body formed of a ceramic material, internal electrodes disposed inside the ceramic body, and external electrodes disposed on the surfaces of the ceramic body and connected with the internal electrodes.

Among such electronic ceramic components, a multilayer ceramic capacitor includes a stack of a plurality of dielectric layers, internal electrodes being alternately and opposingly interleaved therebetween, and external electrodes electrically connected to the internal electrode.

Such a multilayer ceramic capacitor is currently in widespread use for a mobile communications device such as a computer, a personal digital assistant (PDA) and a cellular phone, due to its small size and capability of ensuring high capacitance and ease of mounting.

In response to recent trends towards smaller and high-functional electronic products, chip components therefor are also becoming smaller and high-functional. In this respect, high-capacitance capacitors having a small size are also in demand.

In a typical method of manufacturing a multilayer ceramic capacitor, ceramic green sheets are prepared, and conductive paste is printed onto the ceramic green sheets to thereby form internal electrode layers. Tens to hundreds of the ceramic green sheets, having the internal electrode layers printed thereon, are stacked to thereby form a green ceramic stack. Thereafter, the green ceramic stack is compressed at high temperature under high pressure so as to be hardened, and is then fabricated into a green chip through a cutting process. Subsequently, the green chip is subjected to plasticizing, firing and polishing, and external electrodes are formed thereon, thereby completing a multilayer ceramic condenser.

Recently, there has been an attempt to allow ceramic stacks to have a thin-film like structure and a multilayer structure. However, thinned and multilayered ceramic layers may vary in thickness, depending on whether or not internal electrodes are formed thereon. Moreover, thermal shock may be exerted on a ceramic capacitor due to differences in physical properties between the ceramic layers and the internal electric layers, thereby causing cracks therein.

SUMMARY OF THE INVENTION

An aspect of the present invention provides a multilayer ceramic capacitor capable of achieving a low crack generation rate and a high level of reliability, and a method of manufacturing the same.

According to an aspect of the present invention, there is provided a multilayer ceramic capacitor including: a ceramic body having a plurality of dielectric layers being stacked; at least one internal electrode formed on a corresponding one of the plurality of dielectric layers and having uneven portions formed at an edge thereof, the internal electrode having a connectivity of between 0.7 and 0.9, which is defined by an equation below; and an external electrode formed on an outer surface of the ceramic body and connected with the internal electrode, $$Z = X - Y/X \quad \text{(Equation)}$$

where X denotes a length of a cross-section of the internal electrode in one direction, Y denotes a total length of gaps formed by holes in the cross-section, and Z denotes the connectivity of the internal electrode.

A distance between the uneven portions may range from 50 μm to 150 μm. A height of the uneven portions may range from 2 μm to 16 μm.

The connectivity is lower at the edge of the internal electrode than in a central portion of the internal electrode.

The connectivity may be lower in troughs of the uneven portions than in crests of the uneven portions.

The dielectric layers may each be 10 μm or less in thickness. The plurality of dielectric layers being stacked may be 100 or greater in number.

The internal electrode may have a thickness of between 0.5 μm and 1.5 μm.

According to another aspect of the present invention, there is provided a method of manufacturing a multilayer ceramic capacitor, the method including: preparing a plurality of dielectric layers; forming internal electrodes, each having uneven portions at an edge thereof, on the plurality of dielectric layers, the internal electrodes having a connectivity of between 0.7 and 0.9, defined by an equation below; stacking the plurality of dielectric layers having the internal electrodes formed thereon to thereby form a ceramic body; and forming an external electrode on an outer surface of the ceramic body, $$Z = X - Y/X \quad \text{(Equation)}$$

where X denotes a length of a cross-section of the internal electrode in one direction, Y denotes a total length of gaps formed by holes in the cross-section, and Z denotes the connectivity of the internal electrodes.

A distance between the uneven portions may range from 50 μm to 150 μm. A height of the uneven portions may range from 2 μm to 16 μm.

The connectivity may be lower at the edges of the internal electrodes than in central portions of the internal electrodes.

The connectivity may be lower in troughs of the uneven portions than in crests of the uneven portions.

The dielectric layers may each be 10 μm or less in thickness.

The plurality of dielectric layers being stacked may be 100 or more in number.

The internal electrodes may each have a thickness of between 0.5 μm to 1.5 μm.

BRIEF DESCRIPTION OF THE DRAWINGS

The above and other aspects, features and other advantages of the present invention will be more clearly understood from the following detailed description taken in conjunction with the accompanying drawings, in which:

FIGS. 4A and 4B are views for explaining the connectivity of the internal electrode, wherein FIG. 4A is a cross-sectional view taken along line C-C' of FIG. 3, and FIG. 4B is a cross-sectional view taken along line D-D' of FIG. 3.

DETAILED DESCRIPTION OF THE PREFERRED EMBODIMENT

Figure 1:
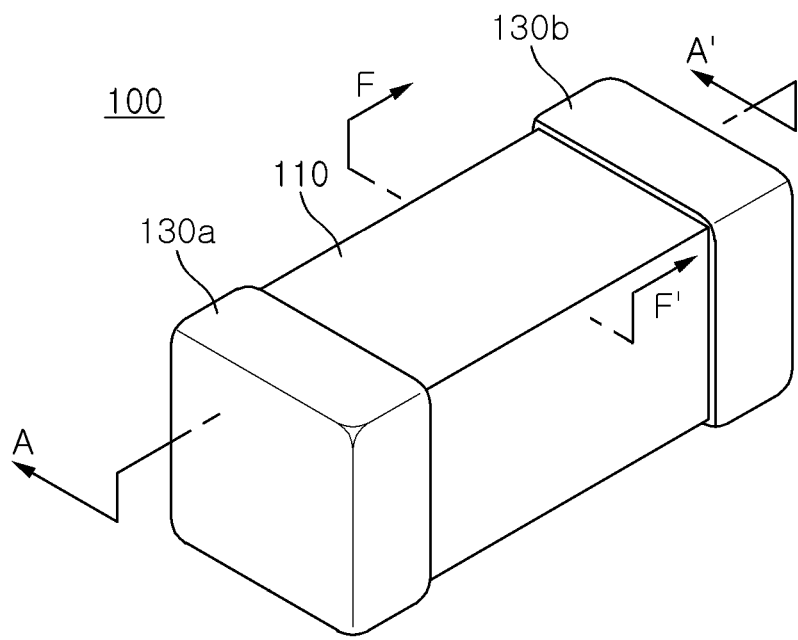
FIG. 1 is a schematic perspective view illustrating a multilayer ceramic capacitor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of elements are exaggerated for clarity. Like reference numerals in the drawings denote like elements.

Figure 2A:
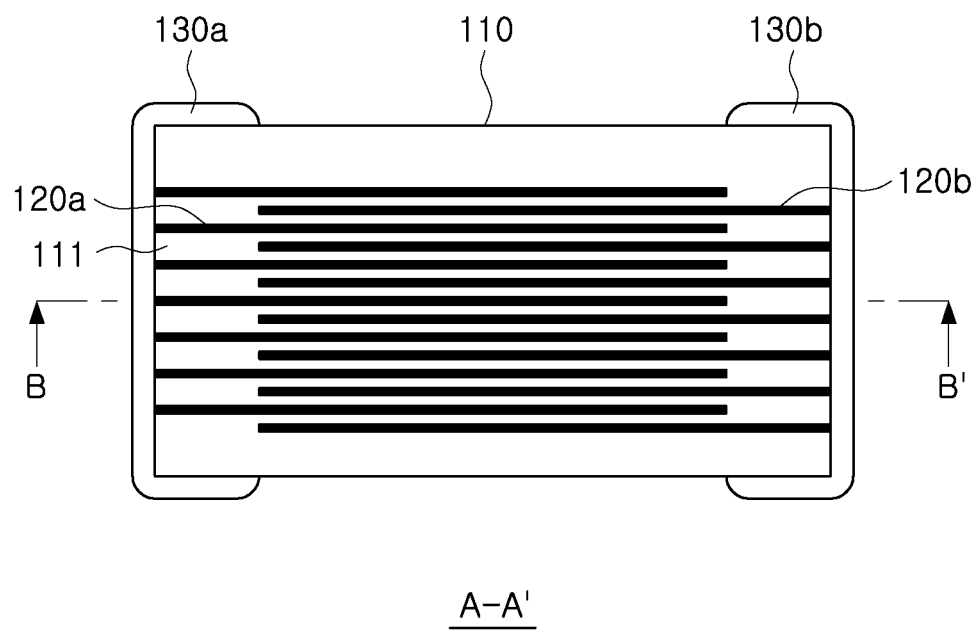
FIG. 2A is a cross-sectional view taken along line A-A' of FIG. 1.
Figure 2B:
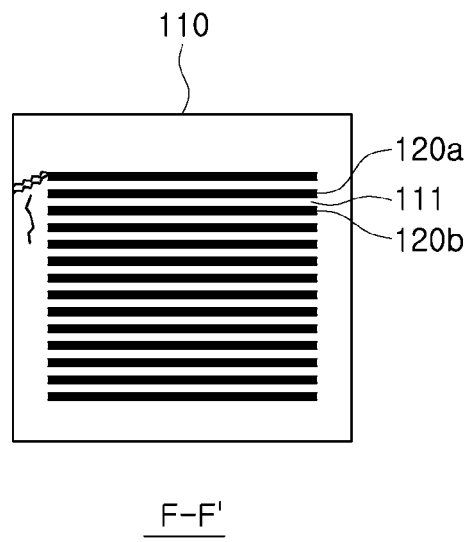
FIG. 2B is a cross-sectional view taken along line F-F' of FIG. 1.

FIG. 1 is a schematic perspective view illustrating a multilayer ceramic capacitor according to an exemplary embodiment of the present invention. FIG. 2A is a cross-sectional view taken along line A-A' of FIG. 1, and FIG. 2B is a cross-sectional view taken along line F-F' of FIG. 1.

Figure 3:
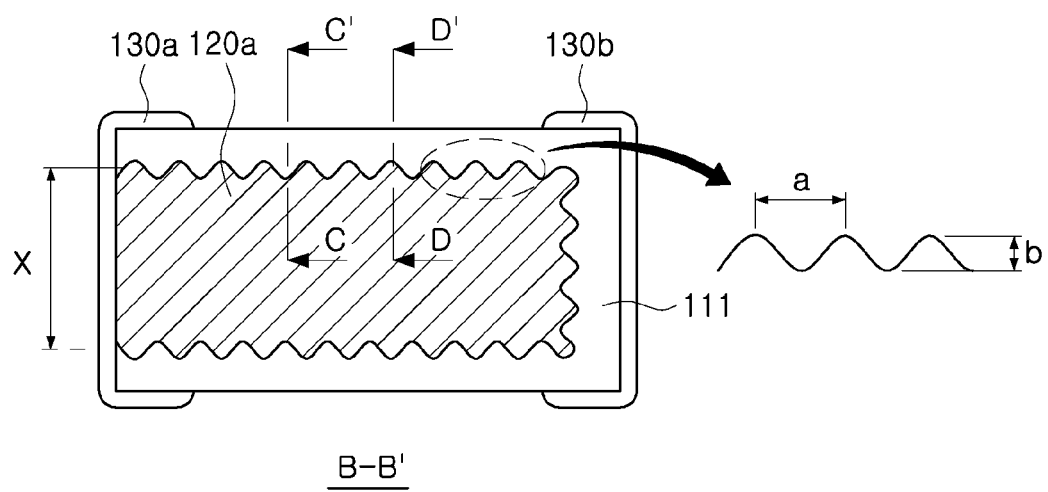
FIG. 3 is a cross-sectional view taken along line B-B' of FIG. 2A to explain the structure of an internal electrode.

FIG. 3 is a cross-sectional view taken along line B-B' of FIG. 2A to illustrate the structure of an internal electrode.

A multilayer ceramic capacitor 100, according to this exemplary embodiment, includes a ceramic body 110 formed as a stack of a plurality of dielectric layers; internal electrodes 120a and 120b interleaved with the dielectric layers; and external electrodes 130a and 130b disposed on the outer surfaces of the ceramic body 110 and electrically connected to the internal electrodes 120a and 120b.

The ceramic body 110 is a stack of a plurality of ceramic dielectric layers 111 (hereinafter, also referred to as dielectric layers or ceramic layers). The ceramic dielectric layers 111 may be integrated through sintering to such an extent that the boundaries between adjacent ceramic dielectric layers are undistinguishable.

The ceramic dielectric layers 111 may be formed of a ceramic material having a high dielectric constant. Such a ceramic material may utilize, for example, barium titanate ($BaTiO_3$)-based materials, lead-perovskite-based materials, strontium titanate ($SrTiO_3$)-based materials, or the like; however, the ceramic material is not limited thereto.

Each of the dielectric layers 111 may be 10 μm or less in thickness. For higher capacitance, the dielectric layers 111 may each have a thickness of 2 μm or less. In this case, each of the dielectric layers 111 may have a thickness of between 0.1 μm and 2 μm.

Each two internal electrodes 120a and 120b are formed on a single dielectric layer 111 of the plurality of dielectric layers 111 in a stacking process thereof. The internal electrodes 120a and 120b are formed inside the ceramic body 110, interleaved with the ceramic dielectric layers 111, through a sintering process.

As for the internal electrodes 120a and 120b, first and second internal electrodes 120a and 120b, having different polarities, may be paired up. The first and second internal electrodes 120a and 120b may be disposed to oppose each other in a direction in which the dielectric layers 111 are stacked One set of the end portions of the first internal electrodes 120a and the other set of the end portions of the second internal electrodes 120b may be exposed to both side surfaces of the ceramic body 110 respectively and alternately.

The first and second internal electrodes 120a and 120b may be formed of conductive metal. For example, the first and second internal electrodes 120a and 120b, although not limited thereto, may be formed of Ni or an Ni alloy, and the Ni alloy may utilize a material containing Mn, Cr, Co or Al together with Ni.

A grain size of the conductive metal may range from 0.1 μm to 0.5 ηM. Furthermore, the internal electrodes 120a and 120b may each have a thickness of between 0.5 μm and 1.5 μm.

The one set of the end portions of the first internal electrodes 120a and the other set of the end portions of the second internal electrodes 120b, exposed to the side surfaces of the ceramic body 110, are electrically connected to the first and second external electrodes 130a and 130b on the outer surfaces of the ceramic body 110, respectively.

As shown in FIG. 3, at least one first internal electrode 120a among the plurality of internal electrodes 120a and 120b may have uneven portions at its edges, and may have a connectivity (i.e., continuity) (Z) of between 0.7 and 0.9. The second internal electrodes 120b may also have the same properties as the illustrated first internal electrode 120a. Here, the connectivity (Z) is defined by the following equation:

$$Z = X - Y/X \qquad \text{Equation}$$

where, X denotes the length of the cross-section of the internal electrode in one direction, and Y denotes the total length of gaps formed by holes in the cross-section.

The uneven portions of the first internal electrode 120a may consist of troughs and crests. A distance 'a' between the uneven portions may be defined as a distance between troughs or between crests.

The distance 'a' between the uneven portions may range from 50 μm to 150 μm, more preferably, from 80 μm to 130 μm.

The distance 'a', which is less than 50 μm and greater than 150 μm attenuates stress release, causing cracks.

The height 'b' of the uneven portions may refer to the height of the trough (i.e., a wave height), and this may be defined as a distance between the crest and the trough. The height 'b' of the uneven portions may range from 2 μm to 16 μm, more preferably, from 3 μm to 14 μm. A height of the uneven portions of less than 2 μm may impair stress release and thus cause cracks, while the height of the uneven portions exceeding 16 μm may result in a reduction in capacitance.

According to an exemplary embodiment of the present invention, as the internal electrode 120a has the uneven portions at its edges, stress concentration can be prevented. Accordingly, cracking, caused by thermal shock, and cracking, caused in the edges of the internal electrode 120a due to different densities between the internal electrode 120a and the dielectric layer 111 can be prevented.

In general, the thermal expansion coefficient of ceramics is on the level of 8 to $9 \times 10^{-6}/\square$, and a thermal expansion coefficient of Ni used for an internal electrode layer is $13 \times 10^{-6}/\square$. Tensile and compressive stress is therefore exerted on a ceramic layer having a relatively small thermal expansion stress coefficient.

Recently, dielectric layers have been thinned to 10 μm or less and more highly stacked in 100 layers or greater.

As the multilayer ceramic capacitor is thinner and more highly stacked, the volume of internal electrodes is increased. Accordingly, stress exerted by thermal shock during a mounting process, such as a firing or reflow process, is increased.

As shown in FIG. 2B, the stress generated by thermal expansion is exerted to the greatest extent on the interface between a ceramic cover layer and an internal electrode layer or on the edges of the internal electrode layer. Accordingly, a ceramic stack having a high level of brittleness may be cracked. Furthermore, a difference in density may occur between an internal electrode portion and a margin portion on which the internal electrode 120a is not positioned. For this reason, vertical cracking may be caused at the edges of the internal electrode 120a.

Furthermore, stress is exerted on the uppermost dielectric layer and the lowermost dielectric layer due to thermal variations. At this time, if voltage is applied thereto, significant damage to the dielectric layers may be generated.

However, according to an exemplary embodiment of the present invention, the edges of the internal electrode 120a on which stress is concentrated are designed to have a curvature, so that stress concentration caused by thermal shock can be prevented and cracking is suppressed. Furthermore, as the difference in density between an internal electrode portion and a margin portion on which an internal electrode is not positioned is reduced, vertical cracking can be prevented from occurring.

Furthermore, as described above, the first internal electrode 120a, according to an exemplary embodiment of the present invention, may have a connectivity of between 0.7 and 0.9.

Figure 4A:
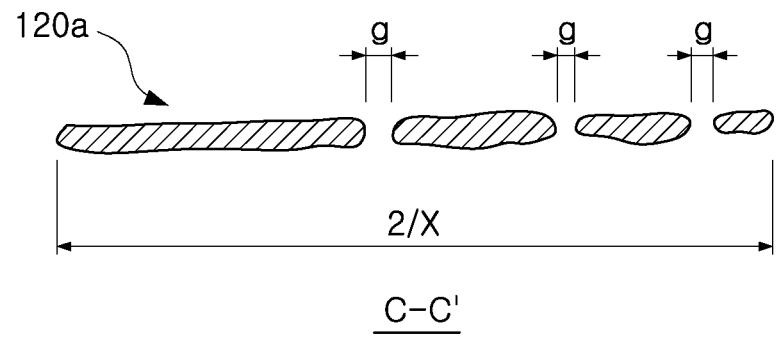
Figure 4B:
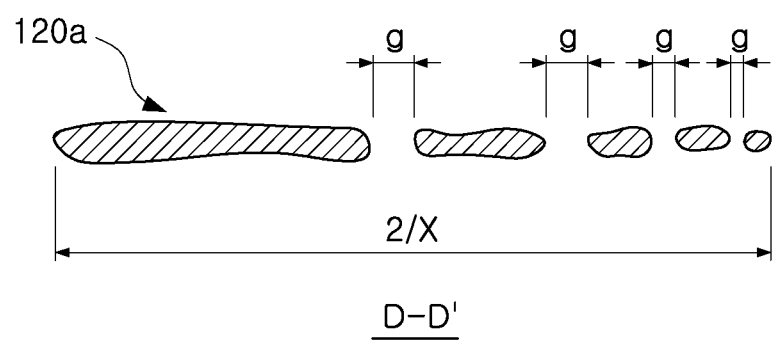

FIGS. 4A and 4B are views for explaining the connectivity of an internal electrode, wherein FIG. 4A is a cross-sectional view taken along line C-C' of FIG. 3, and FIG. 4B is a cross-sectional view taken along line D-D' of FIG. 3.

In more detail, FIG. 4A shows the connectivity in the crests among the uneven portions of the first internal electrode 120a, and FIG. 4B shows the connectivity in the troughs among the uneven portions of the first internal electrode 120a.

The length 'X' of the first internal electrode 120a refers to the length of the cross-section of the first internal electrode 120a in one direction, and may be equal to the sum of the distance from the center of the first internal electrode 120a to one of the troughs of the uneven portions and the distance from the center of the first internal electrode 120a to one of the crests of the uneven portions.

Y refers to the total length of gaps g formed by holes in the cross-section.

According to an exemplary embodiment of the present invention, the connectivity of an internal electrode may be lower at the edges thereof than in the central portion thereof.

Furthermore, the connectivity of the internal electrode in the troughs among the uneven portions may be smaller than that in the crests among the uneven portions.

Referring to FIGS. 4A and 4B, the total length of the gaps in a cross-section from the center of the first internal electrode 120a to the crest is smaller than the total length of the gaps in the cross-section from the center of the first internal electrode 120a to the trough.

The troughs in the edges of the internal electrode 120a are the most susceptible portion to stress concentration. Thus, by reducing the connectivity therein, stress concentration can be prevented.

A portion in which the connectivity of the internal electrode 120a is low refers to a portion in which an internal electrode material is applied at a low density. When the ceramic body is thermally expanded due to thermal shock, the portion having the low density of the internal electrode material is easily deformed, thereby alleviating the stress exerted on a ceramic dielectric layer. Accordingly, a reduction in stress exerted on the interface between the ceramic dielectric layer and the internal electrode 120a, particularly, on the end portion of the internal electrode 120a, is achieved, thereby preventing cracking.

As described above, each of the dielectric layers may be 10 μm or less in thickness, and the number of dielectric layers being stacked may be 100 or more. The thinner the dielectric layers are, the greater is the stress that is generated due to a different expansion rates between the internal electrode 120a and the ceramic dielectric layer under thermal shock. This makes the stack susceptible to cracking, and this susceptibility is aggravated when the dielectric layers are 10 μm or less in thickness.

However, according to an exemplary embodiment of the present invention, the shape and connectivity of the internal electrode 120a are controlled to thereby prevent cracking in the stack.

If the dielectric layers are 2 μm or less in thickness, and 500 or more of such dielectric layers are stacked, the influence of stress generated due to the different expansion rates between the internal electrode 120a and the dielectric layer is increased. However, by controlling the shape and connectivity of the internal electrode 120a, the stack can be prevented from being cracked.

Hereinafter, a method of manufacturing a multilayer ceramic capacitor according to an exemplary embodiment of the present invention will be described.

First, a plurality of dielectric layers are prepared. The dielectric layers may be prepared into ceramic green sheets of a few micrometers (μm) through the following processes: mixing ceramic powder, a binder and solvent together to produce slurry, applying the slurry to a carrier film, and drying the same. For example, the ceramic green sheets may each be prepared to have a thickness of 10 μm or less.

Conductive paste is applied to the prepared ceramic green sheets, thereby forming internal electrode patterns thereon.

As described above, the internal electrode patterns may be formed such that uneven portions are formed at the edges of internal electrodes and a level of the connectivity of the internal electrodes ranges from 0.7 to 0.9.

As for a method of shaping the internal electrode as described above, the internal electrode may be designed to have a predetermined curvature in the process of printing the conductive paste to form the internal electrode.

The internal electrode pattern may be formed by gravure printing. The thickness of the internal electrode and the sizes of the troughs and crests of the uneven portions thereof may be controlled by controlling the depth and size of the cell of a gravure roll.

As described above, the uneven portions may be formed such that the distance 'a' therebetween ranges from 50 μm to 150 μm, and the height 'b' thereof ranges from 2 μm to 16 μm.

Furthermore, the connectivity of the internal electrode maybe controlled by controlling the content and kind of a binder contained in the conductive paste, the content of metal particles thereof, or the like.

Subsequently, the ceramic green sheets having the internal electrode patterns formed thereon are stacked in their thickness direction, thereby manufacturing a ceramic stack.

Thereafter, the ceramic stack is cut into a chip size such that the end portions of the internal electrodes are exposed to the surfaces thereof, and is then fired to thereby form a ceramic body. The firing may be performed at a temperature of between 1100□ and 1300□ in an $N_2$—$H_2$ atmosphere, but the present invention is not limited thereto.

Thereafter, first and second external electrodes are formed to be electrically connected to one set of the end portions of first internal electrodes and the other set of the end portions of second internal electrode, exposed to the side surfaces of the ceramic body, respectively.

As described above, thermal shock may be applied to the ceramic stack in the process of firing the ceramic stack, and stress may be concentrated due to different thermal expansion rates between the dielectric layers and the internal electrodes, thereby causing cracking. However, according to this exemplary embodiment, stress is dispersed by the uneven part formed in the edge portions of the internal electrodes, thereby suppressing cracking. Furthermore, the cracking can be also be suppressed by controlling the connectivity of the internal electrodes.

Also, the multilayer ceramic capacitor, according to an exemplary embodiment of the present invention, may alleviate thermal shock applied in the mounting process, and thus suppress cracking, thereby enhancing reliability.

As shown in Table 1 below, multilayer ceramic capacitors were manufactured while controlling the intervals 'a' of the uneven parts of internal electrodes, the heights 'b' thereof and the connectivity of the internal electrodes. In more detail, Ni contained in conductive paste had particles sizes of between 0.1 μm and 0.2 μm, the layers of the internal electrodes were printed to have a thickness of between 0.6 μm and 1.2 μm. Printed ceramic green sheets were stacked to form a stack, and the stack was subjected to processes such as compression, cutting, firing, formation of external electrodes, plating and the like, thereby manufacturing multilayer ceramic capacitors.

For a thermal shock test, the manufactured multilayer ceramic capacitors were immersed in a lead bath at a temperature of 320□ for two seconds, and the occurrence of cracking was evaluated using a 50-power to 1000 power microscope. The results of the evaluation are shown in Table 1 below.

TABLE 1

| | a (μm) | b (μm) | Connectivity | Capacitance (μF) | Number of generated cracks |
|---|---|---|---|---|---|
| Comparative example | 0 | 0 | 0.7 | 10.3 | 11/300 |
| Inventive example 1 | 80 | 2 | 0.9 | 10.3 | 3/300 |
| Inventive example 2 | 80 | 3 | 0.9 | 10.3 | 0/300 |
| Inventive example 3 | 80 | 5 | 0.9 | 10.3 | 0/300 |
| Inventive example 4 | 80 | 8 | 0.8 | 10.2 | 0/300 |
| Inventive example 5 | 80 | 10 | 0.8 | 10.2 | 0/300 |
| Inventive example 6 | 80 | 14 | 0.7 | 10.1 | 0/300 |
| Inventive example 7 | 80 | 16 | 0.7 | 9.8 | 0/300 |
| Inventive example 8 | 50 | 4 | 0.8 | 10.3 | 0/300 |
| Inventive example 9 | 130 | 4 | 0.9 | 10.3 | 0/300 |
| Inventive example 10 | 150 | 4 | 0.9 | 10.3 | 2/300 |
| Inventive example 11 | 130 | 14 | 0.7 | 10.2 | 0/300 |

Referring to Table 1 above, in the case of the comparative example having no uneven portion, 11/300 cracks were generated during a thermal shock test.

In inventive example 1, the number of cracks caused by thermal shock was reduced to 3/300. In inventive example 2, no cracking occurred in the thermal shock test. Also, in inventive example 7, no cracks were generated under thermal shock, but the capacitance thereof was somewhat decreased to 9.8 μF.

In inventive example 9, cracking did not occur, while in inventive example 10, the number of cracks caused by thermal shock was somewhat increased.

In inventive examples 2 to 6, 8, 9 and 11, cracking was suppressed most effectively even without deteriorating capacitance.

As set forth above, according to exemplary embodiments of the invention, the edges of an internal electrode on which stress is concentrated is designed to have a curvature, thereby preventing stress concentration caused by thermal shock and thus suppressing cracking.

Furthermore, the connectivity of the internal electrode is controlled such that a portion of an internal electrode in which a density of an electrode material is low is deformed to thereby alleviate stress exerted on a ceramic dielectric layer. Accordingly, stress is reduced at the interface between the ceramic dielectric layer and the internal electrode, particularly, in the end portion of the internal electrode, so that cracking can be prevented.

Also, a density difference between an internal electrode portion and a margin portion on which the internal electrode is not positioned is reduced to thereby prevent vertical cracking.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body having a plurality of dielectric layers being stacked;
   at least one internal electrode formed on a corresponding one of the plurality of dielectric layers and having uneven portions formed at an edge thereof, the internal electrode having a connectivity of between 0.7 and 0.9, which is defined by an equation below; and
   an external electrode formed on an outer surface of the ceramic body and connected with the internal electrode,
   wherein the connectivity is lower in troughs of the uneven portions than in crests of the uneven portions, $$Z = X - Y/X \quad \text{(Equation)}$$

where X denotes a length of a cross-section of the internal electrode in one direction, Y denotes a total length of gaps formed by holes in the cross-section, and Z denotes the connectivity of the internal electrode.

2. The multilayer ceramic capacitor of claim 1, wherein a distance between the uneven portions ranges from 50 μm to 150 μm.

3. The multilayer ceramic capacitor of claim 1, wherein a height of the uneven portions ranges from 2 μm to 16 μm.

4. The multilayer ceramic capacitor of claim 1, wherein the connectivity is lower at the edge of the internal electrode than in a central portion of the internal electrode.

5. The multilayer ceramic capacitor of claim 1, wherein the dielectric layers are each 10 μm or less in thickness.

6. The multilayer ceramic capacitor of claim 1, wherein the plurality of dielectric layers being stacked is 100 or greater in number.

7. The multilayer ceramic capacitor of claim 1, wherein the internal electrode has a thickness of between 0.5 μm and 1.5 μm.

8. A method of manufacturing a multilayer ceramic capacitor, the method comprising:
preparing a plurality of dielectric layers;
forming internal electrodes, each having uneven portions at an edge thereof, on the plurality of dielectric layers, the internal electrodes having a connectivity of between 0.7 and 0.9, defined by an equation below;
stacking the plurality of dielectric layers having the internal electrodes formed thereon to thereby form a ceramic body; and
forming an external electrode on an outer surface of the ceramic body,
wherein the connectivity is lower in troughs of the uneven portions than in crests of the uneven portions, $Z=X-Y/X$ (Equation)

where X denotes a length of a cross-section of the internal electrode in one direction, Y denotes a total length of gaps formed by holes in the cross-section, and Z denotes the connectivity of the internal electrodes.

9. The method of claim 8, wherein a distance between the uneven portions ranges from 50 μm to 150 μm.

10. The method of claim 8, wherein a height of the uneven portions ranges from 2 μm to 16 μm.

11. The method of claim 8, wherein the connectivity is lower at the edges of the internal electrodes than in central portions of the internal electrodes.

12. The method of claim 8, wherein the dielectric layers are each 10 μm or less in thickness.

13. The method of claim 8, wherein the plurality of dielectric layers being stacked is 100 or more in number.

14. The method of claim 8, wherein the internal electrodes each have a thickness of between 0.5 μm to 1.5 μm.

* * * * *